US006267489B1

(12) United States Patent
Yamamoto

(10) Patent No.: US 6,267,489 B1
(45) Date of Patent: Jul. 31, 2001

(54) VEHICULAR HEADLAMP HAVING IMPROVED BULB SUPPORT

(75) Inventor: Kaoru Yamamoto, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 09/440,715

(22) Filed: Nov. 16, 1999

(30) Foreign Application Priority Data

Nov. 16, 1998 (JP) ................................................ 10-324836

(51) Int. Cl.[7] ............................. B60Q 1/04; H01R 33/00

(52) U.S. Cl. ......................... 362/519; 362/548; 362/549; 362/226; 362/457; 362/294

(58) Field of Search .................................... 362/519, 548, 362/549, 547, 346, 294, 373, 457

(56) References Cited

U.S. PATENT DOCUMENTS 4,890,202 * 12/1989 Blanche ............................... 362/519
4,922,388 * 5/1990 Freudenreich ....................... 362/519
5,119,276 6/1992 Suzuki .
5,186,535 * 2/1993 Yokoyama ........................... 362/519
5,651,603 * 7/1997 Doring ................................ 362/548
6,109,773 * 8/2000 Nace ................................... 362/519

FOREIGN PATENT DOCUMENTS 2 753 148 12/1998 (FR) ................................ B60Q/1/04

* cited by examiner

*Primary Examiner*—Thomas M. Sember
(74) *Attorney, Agent, or Firm*—Sughrue, Mion, Zinn, Macpeak & Seas, PLLC

(57) ABSTRACT

A vehicular headlamp equipped with a light source bulb composed of a bulb body and a bulb supporting portion for supporting the bulb body and with a reflector in which a bulb insertion hole for insertion of the bulb body of the light source bulb is formed. An annular wall is formed around the bulb insertion hole of the reflector and a bulb abutment face on which the body supporting portion is made to abut from behind is formed in the annular wall. A notch portion that is notched forwards from the bulb abutment face is formed in the annular wall. Accordingly, the heat generated within the reflector is dissipated into the external space and the possibility of heat deformation of the reflector is reduced.

8 Claims, 6 Drawing Sheets

VEHICULAR HEADLAMP HAVING IMPROVED BULB SUPPORT

FIELD OF THE INVENTION

The present invention relates to a vehicular headlamp and, more particularly, to a structure for attachment of a light source bulb of the vehicular headlamp.

BACKGROUND OF THE INVENTION

Generally in a vehicular headlamp, as shown in FIG. 6, a bulb insertion hole 4*b* for insertion of a bulb body 2*b* of a light source bulb 2 is formed in a reflector 4, and an annular wall 4*j* is formed around the bulb insertion hole 4*b*. A body supporting portion 2*c* of the light source bulb 2 is designed to abut on bulb abutment face 4*k* of the annular wall 4*j* from behind (from the exterior of annular wall 4*j* in the direction of bulb insertion).

However, in the conventional vehicular headlamp, as shown in FIG. 6, the body supporting portion 2*c* of the light source bulb 2 substantially closes the bulb insertion hole 4*b* of the reflector 4. Heat is radiated along with the light emitted from a light-emitting portion 2*a* of the light source bulb 2, and the heat tends to be trapped in an internal space of the reflector 4. Hence, a problem exists in that the reflector 4 reaches a high temperature and hence may suffer heat deformation.

SUMMARY OF THE INVENTION

The present invention has been made in consideration of such circumstances, and it is an object of the present invention to provide a vehicular headlamp capable of reducing the possibility of heat deformation of the reflector.

The present invention achieves the above-mentioned object by providing a reflector with a predetermined heat radiating structure.

That is, according to the present invention, there is provided a vehicular headlamp equipped with a light source bulb composed of a bulb body and a bulb supporting portion for supporting the bulb body and with a reflector in which a bulb insertion hole for insertion of the bulb body of the light source bulb is formed, wherein an annular wall is formed around the bulb insertion hole of the reflector with a bulb abutment face on which the body supporting portion of the light source bulb abuts from a direction of bulb insertion, and a notch portion that extends forward from the bulb abutment face.

The specific design, such as the shape, location of formation and the like, of the aforementioned notch portion is not specifically limited as long as the notch portion extends forward (in the direction of bulb insertion) from the bulb abutment face.

As is apparent from the aforementioned construction, in a vehicular headlamp according to the present invention, the notch portion that extends forward from the bulb abutment face is formed in the annular wall of the reflector. With this construction, the internal space of the reflector can communicate with the external space, and the heat generated in the internal space of the reflector can be dissipated into the external space.

Accordingly, the present invention makes it possible to reduce the possibility of heat deformation to the reflector.

In the aforementioned construction, if the body supporting portion abuts the bulb abutment face at three locations along the circumference of the annular wall and notch portions as mentioned are formed at locations that are offset from respective ones of the former three locations, the performance of heat radiation can further be enhanced while stability in supporting the light bulb is maintained.

Further, in the aforementioned construction, if a heat radiation fin is formed on the reflector that extends axially from an outer peripheral face of the annular wall over a substantial portion of the external surface of the reflector, the heat radiation performance can be further enhanced and the reflector strengthened.

In this case, there may be a single heat radiation fin provided. However, formation of a plurality of heat radiation fins enables further enhancement of the heat radiation performance.

A PES-type headlamp refers to a vehicular headlamp wherein the reflector has a reflecting surface of such a shape that light from the light source bulb is reflected forward in a covergent manner, a condensing lens is provided at such a position that, of the light reflected from the reflector, at least a meridian light flux in a vertical cross-section is incident as divergent light, and a shade for blocking the reflected light beams is provided in proximity to a position of convergence of the meridian light flux.

Generally, in such a PES-type headlamp heat tends to be trapped in the internal space of the reflector. In this respect, the vehicular headlamp of the present invention is highly advantageous.

DESCRIPTION OF THE PREFERRED EMBODIMENTS

A preferred embodiment of the present invention will be described hereinafter with reference to the drawings.

Figure 1:
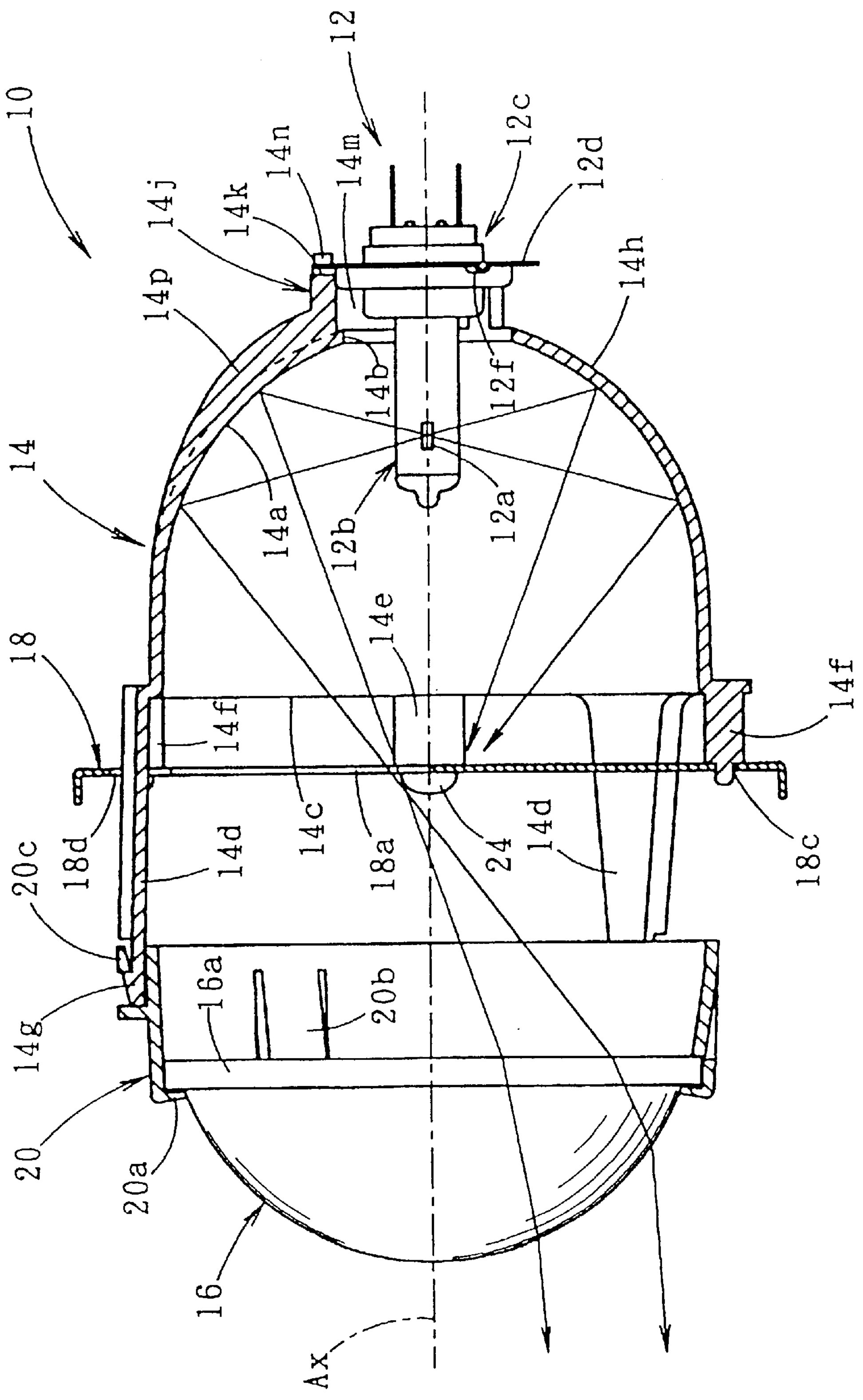
FIG. 1 is a side sectional view of a vehicular headlamp according to one embodiment of the present invention.
Figure 2:
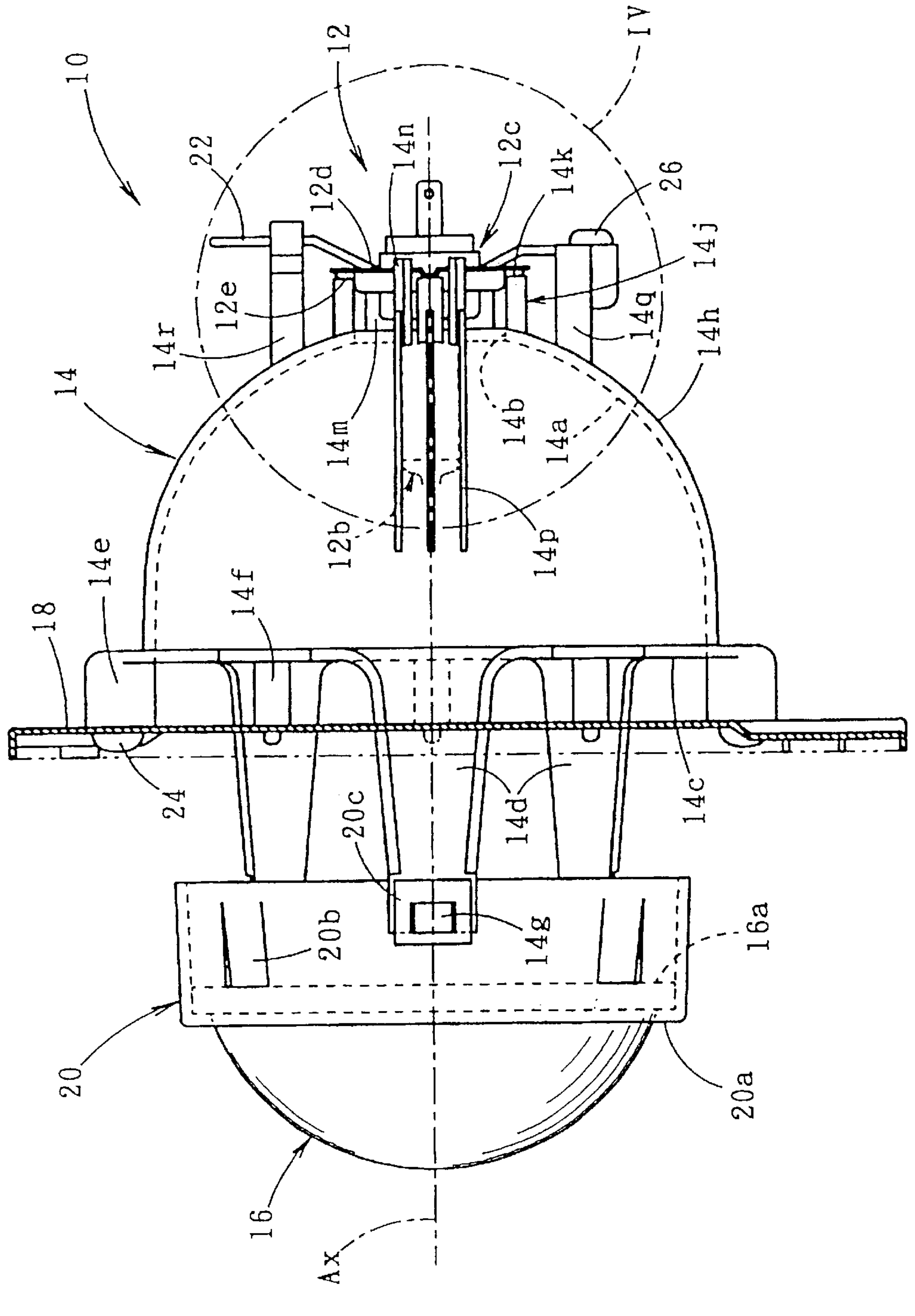
FIG. 2 is a plan view of the aforementioned vehicular headlamp.
Figure 3:
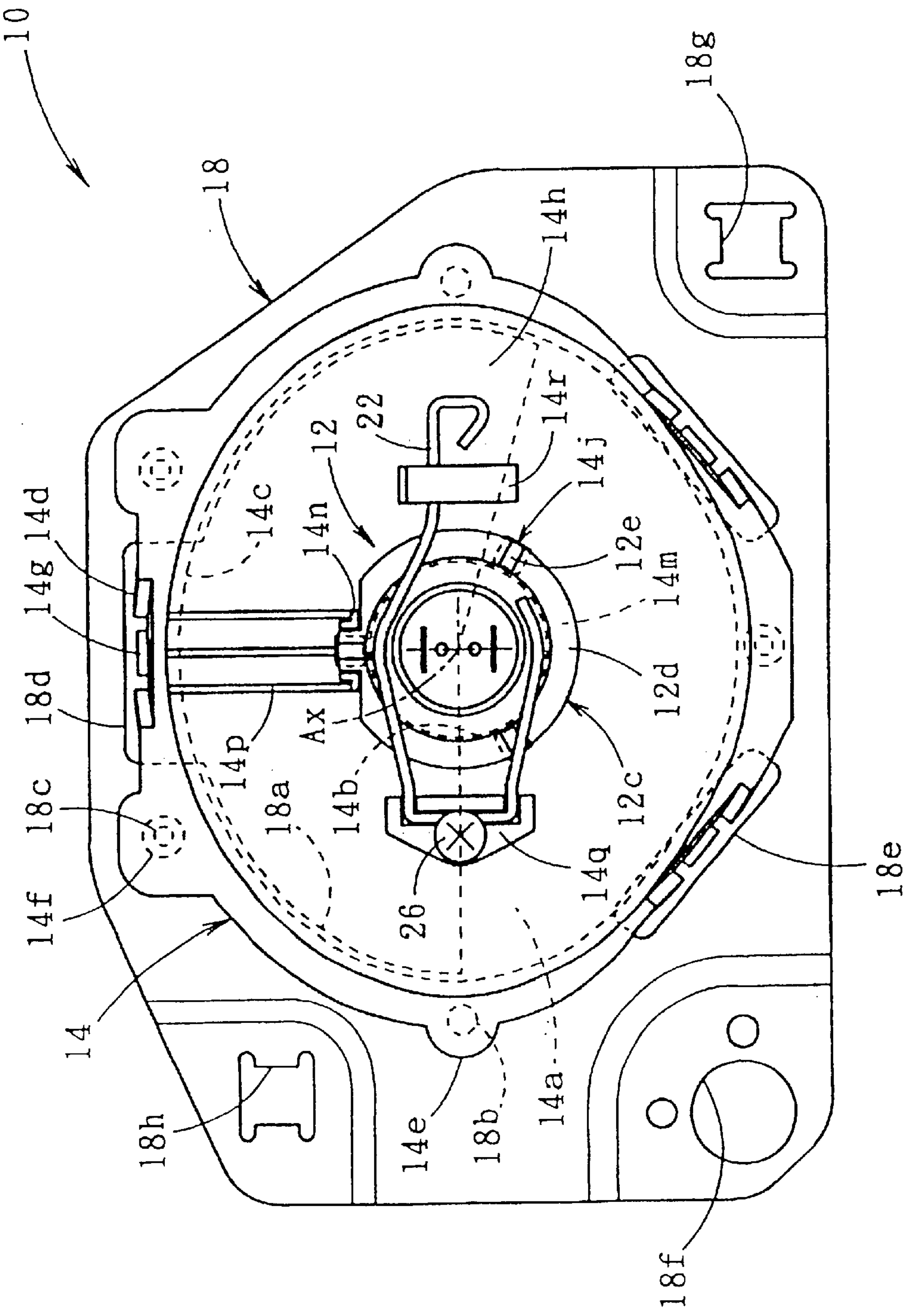
FIG. 3 is a rear view of the aforementioned vehicular headlamp.

FIG. 1 is a side sectional view of a vehicular headlamp according to a preferred embodiment of the present invention. FIGS. 2 and 3 are, respectively, a plan view and a rear view of the headlamp.

As shown in these drawings, a vehicular headlamp 10 according to the present embodiment is a PES-type headlamp that is equipped with a light source bulb 12, a reflector 14, a condensing lens 16, a shade 18 and a lens holder 20.

The light source bulb 12 is a halogen bulb of an H7 type. The light source bulb 12 is composed of a bulb body 12*b* having a single filament 12*a* and a body supporting portion 12*c* supporting the bulb body 12*b*. The light source bulb 12 is attached to a rear (opposite the direction of light propagation along an optical axis) peak portion of the reflector 14 by means of a wire spring 22 (see FIG. 3).

The reflector 14 is a plastic-molded product and has a reflecting surface 14*a* of such a shape that light from the filament 12*a* of the light source bulb 12 is reflected forward (towards the larger, open end of the reflector) in a covergent manner. The reflecting surface 14*a* of the reflector 14 has a substantially elliptic cross-section that includes an optical axis Ax. The eccentricity of the ellipse is greatest in a vertical cross-section and smallest in a horizontal cross-section.

A bulb insertion hole 14*b* for insertion of the bulb body 12*b* of the light source bulb 12 is formed in the rear (peak) portion of the reflector 14. A structure for attachment of the light source bulb 12 (which will be described later) is provided around the bulb insertion hole 14*b*. On the other hand, three arms 14*d* for mounting of the lens holder, two bosses 14*e* for mounting of the shade, and three supporting pins 14*f* for positioning of the shade are formed in a front end opening 14*c* of the reflector 14 in such a manner as to project forward.

The condensing lens 16, which is mounted to the lens holder 20, is positioned such that, of the light reflected from the reflector 14, at least a meridian light flux (the light flux shown in FIG. 1 in the vertical cross-section including the light axis) is incident as divergent light. The lens holder 20, which is a ring-like plastic member having an inner diameter substantially equal to the outer diameter of the condensing lens 16, is securely supported by the reflector 14.

The condensing lens 16 is mounted to the lens holder 20 by fitting the condensing lens 16 to the lens holder 20 from behind. That is, an annular flange 20*a* that abuts the front face of a peripheral flange 16*a* of the condensing lens 16 is formed at a front-end inner peripheral portion of the lens holder 20. Engagement strips 20*b* are formed at three locations along the circumference of the lens holder 20 in such a manner as to project toward the inner periphery by being cut out of the lens holder 20. These engagement strips 20*b* engage peripheral portions on the back face of the condensing lens 16 fitted to the lens holder 20.

The lens holder 20 is securely supported by the reflector 14 through lance engagement at lance engagement portions 20*c* formed at three locations on the outer peripheral face of the lens holder 20. Lances 14*g* are formed at leading end portions of the respective arms 14*d* for mounting of the lens holder by engagement with the respective lance engagement portions 20*c*. Flanges for reinforcement are formed at both side portions of each of the arms 14*d*.

The shade 18 is a press-molded member made of steel plate. The shade 18 is securely supported by the reflector 14 and is located in the vicinity of a position of convergence of the meridian light flux that constitutes part of the aforementioned reflected light. A light passage opening 18*a* is formed in the shade 18, which covers a lower area of the front end opening 14*c* of the reflector 14, creating a shaded sector. Thereby, the light reflected from the lower reflection area of the reflector 14 is blocked.

The shade 18 is securely supported by the reflector 14 by screws on left and right sides of the front end opening 14*c* of the reflector 14. Bosses 14*e*, for mounting of the shade of the reflector 14, are formed on left and right sides of the front end opening 14*c*, and screw insertion holes 18*b* are formed in the shade 18 at locations corresponding to the bosses 14*e* for attaching the shade. Screws 24 are inserted through the respective insertion holes 18*b* and secured into the respective bosses 14*e* to attach and secure the shade.

The supporting pins 14*f* for positioning the shade are disposed at three locations, two upper edge portions and one lower edge portion, of the front end opening 14*c* of the reflector 14. Each of the supporting pins 14*f* is composed of a large-diameter portion of the same length as the bosses 14*e* for attaching the shade, and a small-diameter portion projecting from a leading end face of the large-diameter portion. The small-diameter portion is inserted through a positioning hole 18*c* formed in the shade 18 so that the shade 18 abuts the leading edge face of the large-diameter portion. When attaching the shade 18 to the reflector 14, the shade 18 is held in position by the supporting pins 14*f*. As a result, after attachment of shade 18 to the reflector 14, looseness between the shade 18 and the reflector 14 is prevented.

Notch portion 18*d* is formed by an opening in the upper portion of the translucent opening 18*a* and a pair of arm insertion holes 18*e* are formed in the shade 18 to avoid interference with the respective arms 14*d* for attaching the lens holder to the reflector 14.

The shade 18 is designed to perform the f unction of an aiming bracket. An aiming member (not shown) for tilting the reflector 14 is attached to the shade 18.

The shade 18 is much larger than the front end opening 14*c* of the reflector 14. A fulcrum hole 18*f* is formed in a lower corner portion of the shade 18, and an aiming fulcrum member (not shown) is mounted thereto. A point-of-application hole 18*g* is formed in the other lower corner portion of the shade 18, and a nut screwed together with an aiming screw (not shown) for left-and-right tilting movements is mounted thereto. Further, a point-of-application hole 18*h* is formed in an upper corner portion located above the fulcrum hole 18*f*, and a nut screwed onto an aiming screw (not shown) for up-and-down tilting movements is mounted thereto.

Next, the structure for attaching the light source bulb 12 to the reflector 14 will be described.

Figure 4:
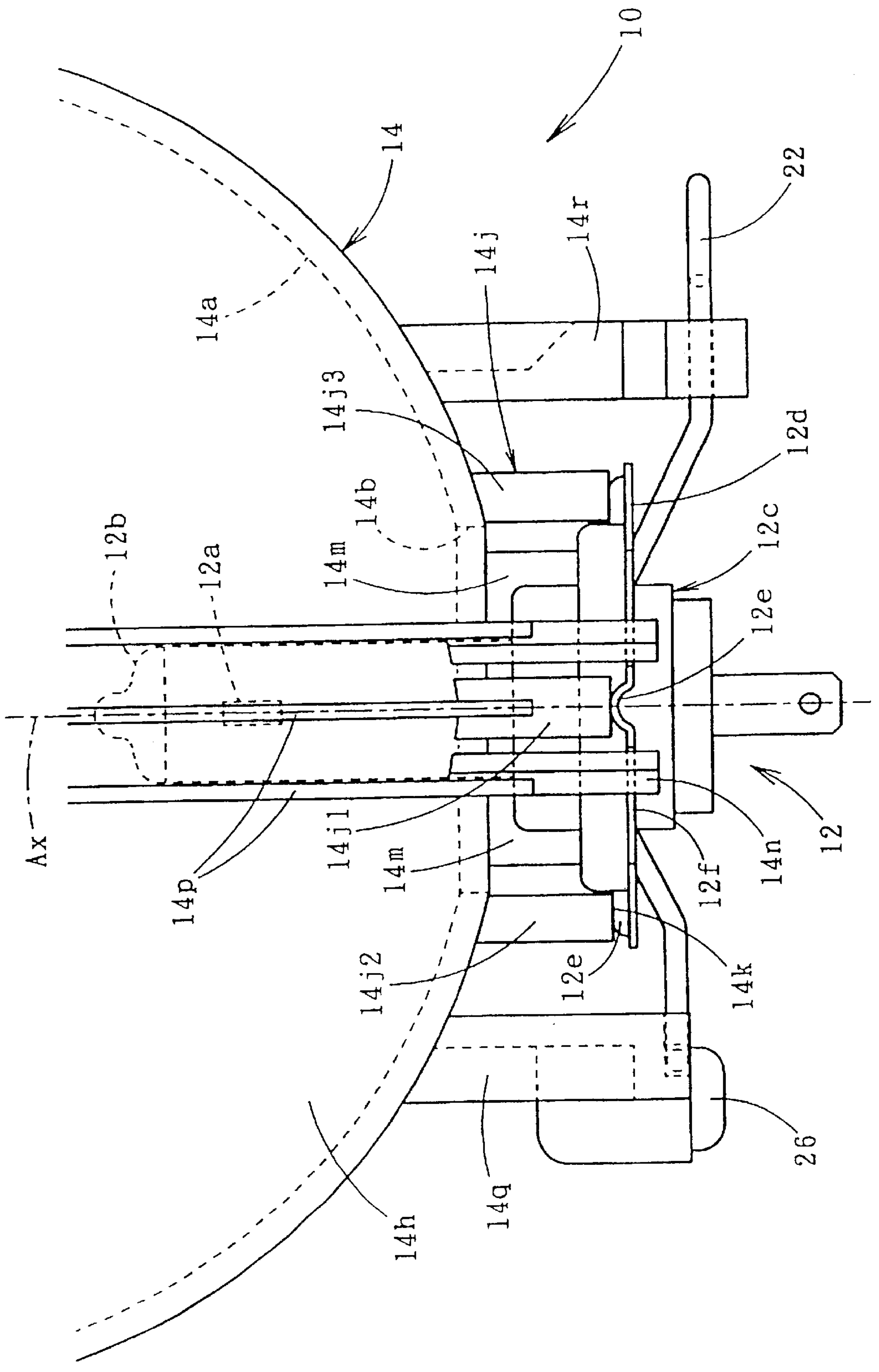
FIG. 4 is a detailed view of a section IV indication in FIG. 2.
Figure 5:
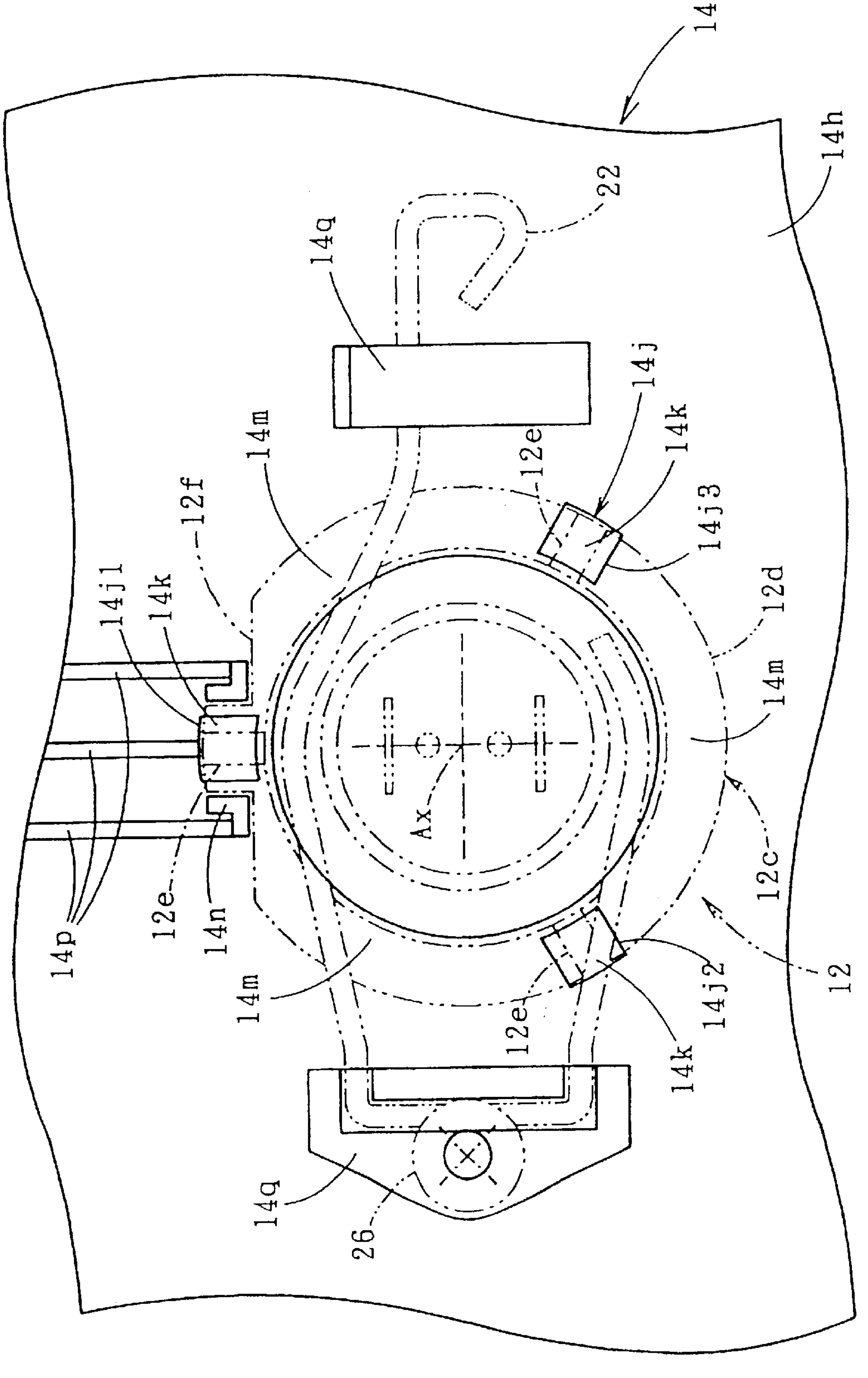
FIG. 5 is a detailed rear view of a rear top portion of a reflector of the aforementioned vehicular headlamp.
Figure 6:
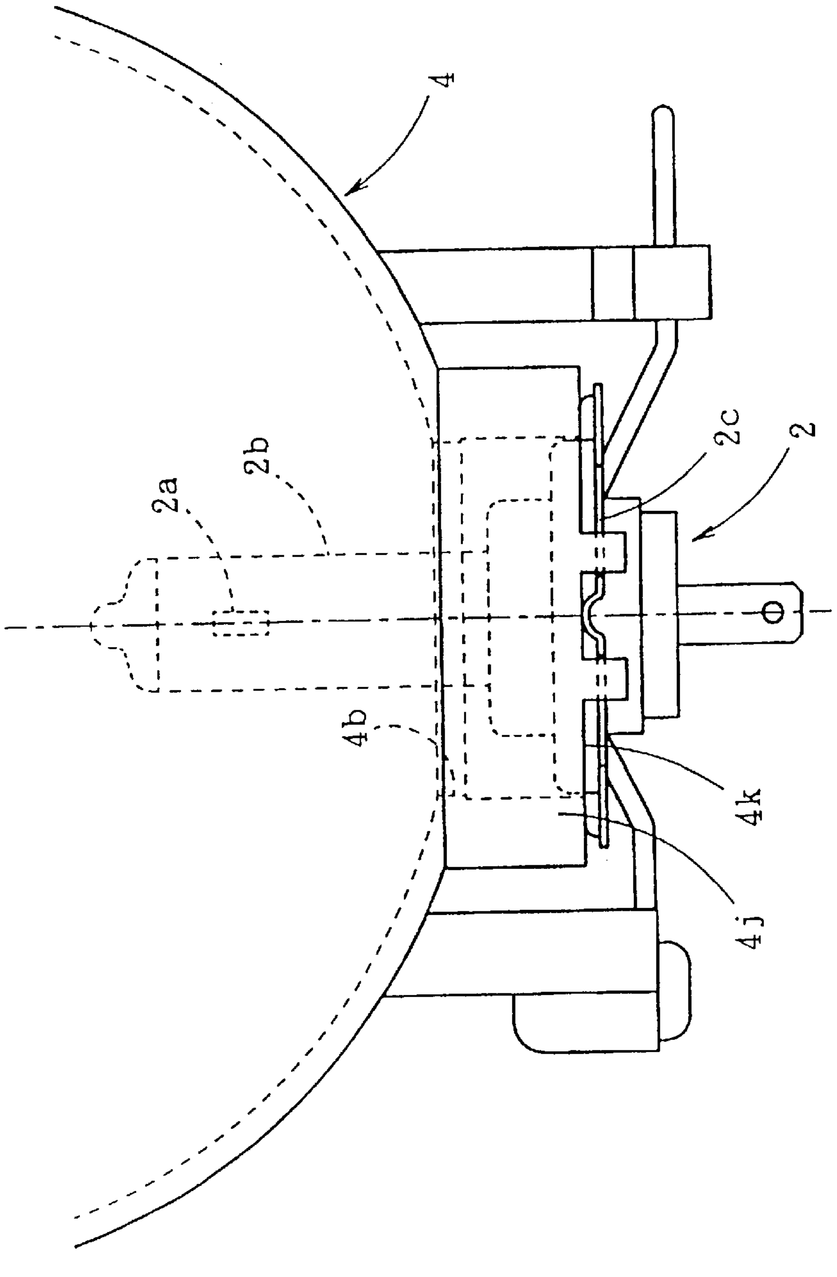
FIG. 6 PRIOR ART
FIG. 6 is a drawing similar to FIG. 5 and shows a conventional example.

FIG. 4 is a detailed view of a section IV of FIG. 2, and FIG. 5 is a detailed rear view of the rear (peak) portion of the reflector 14.

As shown in these drawings, the body supporting portion 12*c* of the light source bulb 12 is provided with a ring portion 12*d*. Projecting portions 12*e*, for positioning the light source bulb 12 in the direction of the optical axis Ax while attaching the light source bulb 12 to the reflector 14, are formed in the ring portion 12*d* at an upper edge location and at locations separated from the upper edge location by 120° in each direction.

An annular wall 14*j* is formed around the bulb insertion hole 14*b* on the exterior surface 14*h* of the reflector 14 extending outward (rearward). A bulb abutment face 14*k*, on which the three projecting portions 12*e* of the body supporting portion 12*c* of the light source bulb 12 abut from behind, is formed at the rear (outermost) end of the annular wall 14*j*, and is substantially perpendicular to the optical axis Ax. Notch portions 14*m* are indented forward from the bulb abutment face 14*k* and are formed in the annular wall 14*j* at three locations that are offset from respective ones of the aforementioned three locations corresponding to the three projecting portions 12*e*. The indentations of the respective notch portions 14*m* extend through the annular wall 14*j* to the back face 14*h* of the reflector 14. Hence, the annular wall 14*j*, in this example, includes only three columnar projections corresponding to the three projecting portions 12*e*.

Of the three columnar portions 14*j*1, 14*j*2 and 14*j*3 that constitute the annular wall 14*j*, the columnar portion 14*j*1 located at the upper edge portion is provided with engagement pins 14*n*. The engagement pins 14*n* are formed on the left and right sides of the columnar portion 14*j*1 and extend rearward beyond the ring portion 12*d* of the light source bulb 12, have an L-shaped cross-section, and are symmetrical.

The engagement pins 14*n* engage a pair of positioning notch portions 12*f* formed in the aforementioned ring portion 12*d*, whereby the light source bulb 12 is held in position, rotationally.

Heat radiation fins 14*p* are formed on the columnar portion 14*j*1 of the annular wall 14*j* and on upper surfaces of the respective engagement pins 14*n*, and extend onto the external surface 14*h* of the reflector 14. The heat radiation fins 14*p* are formed in such a manner as to extend over a substantial portion of the reflector external surface 14*h*.

A spring supporting portion 14*q*, for rotatable attachment of the wire spring 22 by means of a screw 26, and a spring latch portion 14*r*, for latching of a leading end portion of the wire spring 22, are formed, respectively, on left and right sides of the annular wall 14*j* on the external surface 14*h* of the reflector 14.

Next, the operation of the present embodiment will be described.

The vehicular headlamp 10 according to the present invention includes the reflector constructed of a plastic material, and the annular wall including notch portions 14*m* that extend forward from the bulb abutment face 14*k*. Therefore, the internal space of the reflector 14 can communicate with the external space, whereby the heat generated in the internal space of the reflector 14 is radiated to the external space through the notch portions 14*m*.

Accordingly, the present embodiment makes it possible to reduce the possibility of heat deformation to the reflector 14.

Further, according to the present embodiment, the body supporting portion 12*c* of the light source bulb 12 abuts the bulb abutment face 14*k* at three locations along the circumference of the annular wall 14*j*, and the aforementioned notch portions 14*m* are formed in the annular wall 14*j* at three locations that are offset from respective ones of the former three locations along the circumference of the annular wall 14*j*. Therefore, it is possible to further enhance the heat radiation performance. Moreover, the respective notch portions 14*m* extend to the external surface 14*h* of the reflector 14 so that the annular wall 14*j* includes only the three columnar portions corresponding to the three projecting portions 12*e* of the body supporting portion 12*c*. Thus, it is possible to achieve extremely good heat radiation performance.

Furthermore, according to the present embodiment, the heat radiation fins 14*p* extend from the outer peripheral face of the annular wall 14*j* over a substantial portion of the external surface 14*h* of the reflector 14. This also helps to enhance heat radiation performance. The heat radiation fins 14*p* are formed above the bulb body 12*b* of the light source bulb 12 where the temperature tends to be highest. Thereby, the heat radiation effect is further improved. Also, the reflector 14 is strengthened through formation of the heat radiation fins 14*p*.

In the present embodiment, the internal space of the reflector 14 also communicates with the external space on the side of the front end opening 14*c* of the reflector 14. This, combined with the aforementioned structure for attachment of the light source bulb, enables further enhancement of heat radiation performance.

Still further, in the present embodiment, the respective notch portions 14*m* are extended completely to the external surface 14*h* of the reflector 14. However, even in the case where the notch portions 14*m* do not extend to the external surface 14*h* of the reflector 14, the notch portions themselves are capable of radiating the heat generated in the internal space of the reflector 14 to the external space. Therefore, it is still possible to reduce the possibility that heat deformation of the reflector 14 occurs.

The vehicular headlamp 10 according to the present embodiment is a PES-type headlamp, and the internal space of the reflector 14 in which the heat is trapped has a small volume. In this respect, the vehicular headlamp 10 is highly advantageous.

The present embodiment has been described for the case where the light source bulb 12 is a halogen bulb of an H7 type. However, even in the case where a halogen bulb of another type such as an H4 type is employed, or where a discharge bulb or the like is employed, the operation and effects of the invention are substantially the same as in the present embodiment. The same benefits can be obtained by adopting substantially the same structure for attachment of the light bulb as in the present embodiment. In particular, a discharge bulb operates at a high temperature. Therefore, the structure of the present embodiment can be advantageously applied to the discharge bulb.

Furthermore, although the present embodiment has been described with reference to the PES-type headlamp, the operation and effect are substantially the same in an ordinary headlamp. The same benefits can be attained by adopting substantially the same structure for attachment of the light bulb as in the present embodiment.

It should further be apparent to those skilled in the art that various changes in form and detail of the invention as shown and described above may be made. It is intended that such changes be included within the spirit and scope of the claims appended hereto.

What is claimed is:

1. A vehicular headlamp assembly, comprising:

a light source bulb comprising a bulb body, a bulb supporting portion for supporting said bulb body; and a reflector, said reflector having an ellipsoid shape terminating at an open forward end and a smaller open rear end, a bulb insertion hole for insertion of said bulb body of said light source bulb being formed in said smaller open rear end of said reflector, said reflector comprising an annular wall on an exterior thereof disposed around said bulb insertion hole and axially extending along a optical axis of said reflector, said annular wall comprising a bulb abutment face on an exterior surface thereof, said exterior surface being substantially perpendicular to said optical axis of said reflector, said bulb supporting portion of said light source bulb abutting said bulb abutment face from a direction of bulb insertion, and said annular wall having at least one notch portion that extends though said annular wall, said notch portion comprising an area indented from said bulb abutment face and extending forward from said bulb abutment face to said bulb insertion hole on the exterior surface of said reflector, wherein said notch portion facilitates heat dissipation by allowing heat to escape from inside said reflector.

2. The vehicular headlamp assembly according to claim 1, wherein:

said bulb supporting portion of said light source bulb abuts said bulb abutment face at three locations along a circumference of said annular wall; and said notch portion is provided at three locations in said annular wall that are offset from respective ones of said three bulb supporting portion abutting locations.

3. The vehicular headlamp assembly according to claim 2, wherein:

said reflector has a reflecting surface on an interior thereof with a shape such that light from said light source bulb is reflected forward in a convergent manner; and further comprising:

a condensing lens provided at such a position that, of the light reflected from said reflector, at least a meridian light flux in a vertical cross-section is incident to said condensing lens as divergent light; and a shade for blocking at least a portion of said reflected light beams provided in proximity to a position of convergence of said meridian light flux.

4. The vehicular headlamp assembly according to claim 1, wherein:

said reflector has a reflecting surface on an interior thereof with a shape such that light from said light source bulb is reflected forward in a convergent manner;

a shade for blocking at least a portion of said reflected light beams is provided in proximity to a position of convergence of said meridian light flux; and further comprising:

a condensing lens provided at such a position that, of the light reflected from said reflector, at least a meridian light flux in a vertical cross-section is incident to said condensing lens as divergent light.

5. The vehicular headlamp assembly according to claim 1, wherein said annular wall comprises a plurality of columnar portions and said notch portion is partially defined by said plurality of columnar portions.

6. A vehicular headlamp assembly comprising:

a light source bulb comprising a bulb body, a bulb supporting portion for supporting said bulb body;

a reflector;

said reflector having an ellipsoid shape terminating at an open forward end and a smaller open rear end, a bulb insertion hole for insertion of said bulb body of said light source bulb being formed in said smaller open rear end of said reflector, said reflector comprising an annular wall on an exterior thereof disposed around said bulb insertion hole and axially extending along a optical axis of said reflector, said annular wall comprising a bulb abutment face on an exterior surface thereof, said exterior surface being substantially perpendicular to said optical axis of said reflector, said bulb supporting portion of said light source bulb abutting said bulb abutment face from a direction of bulb insertion, said annular wall having at least one notch provided therein, said notch portion comprising an area indented from said bulb abutment face and extending to said bulb insertion hole on the exterior surface of said reflector; and a heat radiation fin disposed in said reflector and extending axially along an outer peripheral face of the annular wall and over a substantial portion of said reflector.

7. The vehicular headlamp assembly according to claim 6, wherein:

said reflector has a reflecting surface on an interior thereof with a shape such that light from said light source bulb is reflected forward in a convergent manner; and further comprising:

a condensing lens provided at such a position that, of the light reflected from said reflector, at least a meridian light flux in a vertical cross-section is incident to said condensing lens as divergent light; and a shade for blocking at least a portion of said reflected light beams provided in proximity to a position of convergence of said meridian light flux.

8. A vehicular headlamp assembly comprising:

a light source bulb comprising a bulb body, a bulb supporting portion for supporting said bulb body; and a reflector;

said reflector having an ellipsoid shape terminating at an open forward end and a smaller open rear end, a bulb insertion hole for insertion of said bulb body of said light source bulb being formed in said smaller open rear end of said reflector, said reflector comprising an annular wall on an exterior thereof disposed around said bulb insertion hole and axially extending along a optical axis of said reflector, said annular wall comprising a bulb abutment face on an exterior surface thereof, said exterior surface being substantially perpendicular to said optical axis of said reflector, said bulb supporting portion of said light source bulb abutting said bulb abutment face from a direction of bulb insertion, said annular wall having at least one notch portion provided therein, said notch portion comprising an area indented from said bulb abutment face and extending to said bulb insertion hole on the exterior surface of said reflector, wherein said bulb supporting portion of said light source bulb abuts said bulb abutment face at three locations along a circumference of said annular wall; and said notch portion is provided at three locations in said annular wall that are offset from respective ones of said three bulb supporting portion abutting locations, further comprising a heat radiation fin disposed in said reflector and extending axially along an outer peripheral face of the annular wall and over a substantial portion of said reflector.

* * * * *